(12) United States Patent
Singh et al.

(10) Patent No.: US 8,732,112 B2
(45) Date of Patent: May 20, 2014

(54) METHOD AND SYSTEM FOR ROOT CAUSE ANALYSIS AND QUALITY MONITORING OF SYSTEM-LEVEL FAULTS

(75) Inventors: Satnam Singh, Bangalore (IN); John V Bowman, Farmington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 277 days.

(21) Appl. No.: 13/329,816

(22) Filed: Dec. 19, 2011

(65) Prior Publication Data

US 2013/0159240 A1    Jun. 20, 2013

(51) Int. Cl.
*G06F 17/00* (2006.01)
*G06N 5/02* (2006.01)

(52) U.S. Cl.
USPC .......................................................... 706/51

(58) Field of Classification Search
USPC .......................................................... 706/51
See application file for complete search history.

(56) References Cited

U.S. PATENT DOCUMENTS

| | | | |
|---|---|---|---|
| 6,477,452 B2 | 11/2002 | Good | |
| 7,209,860 B2 | 4/2007 | Trsar et al. | |
| 7,379,799 B2 | 5/2008 | Cleary et al. | |
| 7,765,040 B2 | 7/2010 | Underdal et al. | |
| 8,027,782 B2 * | 9/2011 | Assaf et al. | 701/111 |
| 8,301,333 B2 * | 10/2012 | Singh et al. | 701/31.4 |
| 8,392,096 B2 * | 3/2013 | Mathews et al. | 701/111 |
| 8,433,472 B2 * | 4/2013 | Singh et al. | 701/31.4 |
| 8,473,330 B2 * | 6/2013 | Singh et al. | 705/7.37 |
| 8,498,776 B2 * | 7/2013 | Singh et al. | 701/33.4 |
| 8,509,985 B2 * | 8/2013 | Subramania et al. | 701/29.3 |
| 8,527,441 B2 * | 9/2013 | Singh | 706/45 |
| 8,532,908 B2 * | 9/2013 | Morgan et al. | 701/102 |
| 8,601,862 B1 * | 12/2013 | Bowman et al. | 73/114.05 |
| 2005/0222817 A1 | 10/2005 | Achacoso et al. | |
| 2008/0228338 A1 | 9/2008 | Howard et al. | |
| 2010/0191414 A1 | 7/2010 | Salman et al. | |
| 2010/0228423 A1 | 9/2010 | Howell et al. | |
| 2011/0029186 A1 | 2/2011 | Ishikawa | |
| 2011/0071724 A1 | 3/2011 | Heine et al. | |
| 2011/0145026 A1 | 6/2011 | Singh et al. | |

FOREIGN PATENT DOCUMENTS

EP            997638            2/2007

* cited by examiner

*Primary Examiner* — Michael B Holmes
(74) *Attorney, Agent, or Firm* — Mark S. Cohen; Pearl Cohen Zedek Latzer Baratz LLP

(57) ABSTRACT

System fault codes, component fault codes, and failure modes may be received at a system. A first level model comprising first level causal relationships and first level causal weights between the system fault codes and the component fault codes may be generated. A second level model comprising second level causal relationships and second level causal weights between the component fault codes and the failure modes may be generated. The first level model and the second level model may be combined to generate a model such as graphical model. One or more causal probabilities may be determined using the graphical model.

20 Claims, 6 Drawing Sheets

METHOD AND SYSTEM FOR ROOT CAUSE ANALYSIS AND QUALITY MONITORING OF SYSTEM-LEVEL FAULTS

FIELD OF THE PRESENT INVENTION

The present invention is related to root cause analysis and quality monitoring of system-level faults using, for example, probability-based method that uses fleet-wide vehicle diagnostic history.

BACKGROUND OF THE INVENTION

The automotive, aerospace, heavy equipment, manufacturing, and other industries seek to improve the quality and reliability of vehicles by incorporating fault diagnosis and prognosis features into vehicles or off-board monitoring at technical centers. For example, fault codes (e.g., diagnostic trouble codes (DTCs) may be used by technicians (e.g., vehicle technicians, aircraft technicians, manufacturing technicians), quality engineers (e.g., vehicle quality engineers, aerospace quality engineers, etc.), diagnostic engineers and other parties to identify and diagnose vehicle, aircraft, aeronautical vehicle, heavy equipment, machinery, or other device malfunctions. Fault codes may, for example, include diagnostic trouble codes, which may be used for vehicle diagnostics. Diagnostic trouble codes may, for example, be the output of a diagnostic method or system which continuously monitors a specific component (e.g., a sensor associated with a vehicle component, system, circuit or other device) and may be stored in vehicle electronic control unit (ECU). Diagnostic trouble codes may indicate a failure, malfunction, or defect in a system, component, circuit or other electrical device. Diagnostic trouble codes may, for example, include system-level diagnostic codes (SDTCs), component or circuit-level DTCs, and other types of DTCs. Diagnostic trouble codes may, for example, indicate a failure, malfunction, or defect of a vehicle system (e.g., engine misfire, evaporative system performance, battery failure, or other vehicle system failures). Component or circuit-level DTCs may, for example, indicate failure, malfunction, or defect of a vehicle component (e.g., fuel injector, mass airflow (MAF) sensor, etc.). Typically, a component is a part of a system and/or subsystem; e.g., a fuel injector may be a part of an engine system. In some cases a system may be a component of a larger system. System-level faults may, for example, be triggered due to any of component or circuit-level related faults in that system. For example, an engine misfire system-level fault could be triggered due to injector circuit failure, mass air flow circuit failure, fuel pump malfunction, etc.

In some cases, a system fault code (e.g. a system DTC) may potentially result from multiple failure modes or root causes. A failure mode may, for example, include part name information and possibly other information describing or representing a malfunction or failure. A failure mode or root cause may be associated with multiple unique combinations of component fault codes (e.g. component DTCs), system fault codes (e.g., system DTCs), and/or other information. Existing techniques are unable to identify failure modes have the same or similar fault code or DTC signatures (e.g., combinations of system DTCs, component DTCs, and/or other DTCs). It may, therefore, be difficult to determine failure modes and root causes of vehicle malfunctions based on system fault codes or combinations of system fault codes, component fault codes and/or other fault codes. It may, therefore, be difficult for vehicle technicians, quality engineers, and others to determine vehicle malfunction root causes, fleet wide vehicle malfunction trends, and other information using existing techniques.

SUMMARY OF THE INVENTION

System fault codes, component fault codes, and failure modes may be received at a system. A first level model comprising first level causal relationships and first level causal weights between the system fault codes and the component fault codes may be generated. A second level model comprising second level causal relationships and second level causal weights between the component fault codes and the failure modes may be generated. The first level model and the second level model may be combined to generate a model such as graphical model. One or more causal probabilities may be determined using the graphical model.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
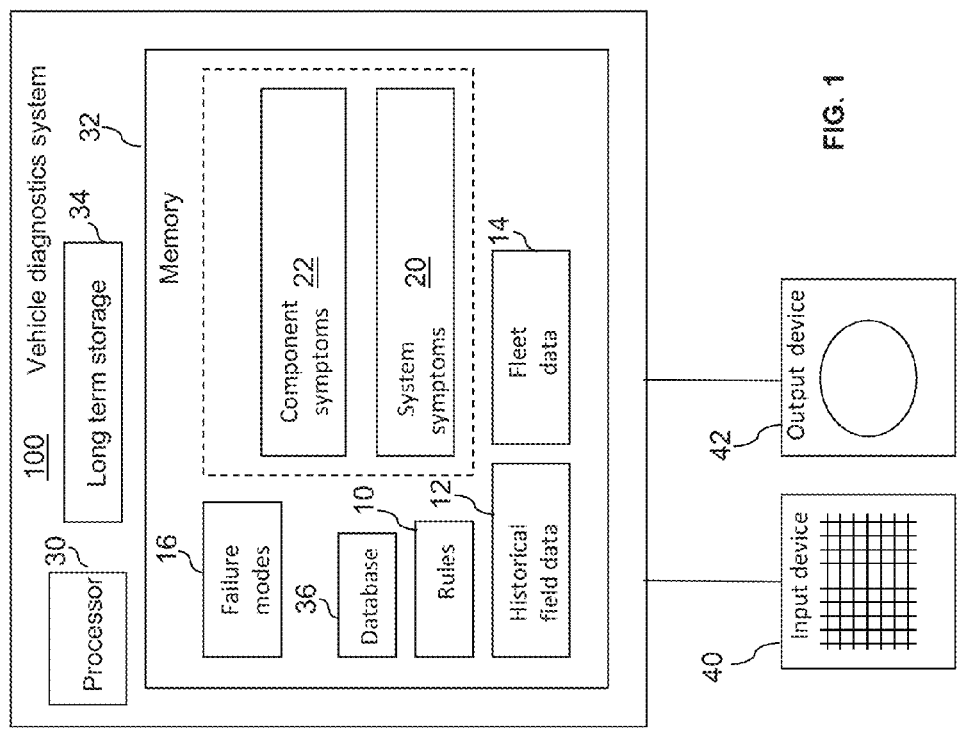
FIG. 1 is schematic diagram of a vehicle diagnostics system according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

Unless specifically stated otherwise, as apparent from the following discussions, throughout the specification discussions utilizing terms such as "processing", "computing", "storing", "determining", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

FIG. 1 is schematic diagram of a vehicle diagnostics system according to embodiments of the present invention. Vehicle diagnostics system 100 may include one or more processor(s) or controller(s) 30, memory 32, long term storage 34, input device(s) or area(s) 40, and output device(s) or area(s) 42. Input device(s) or area(s) 40 and output device(s) or area(s) 42 may be combined into, for example, a touch screen display and input which may be part of system 100.

System 100 may include one or more databases 36. Memory 32 or databases 36 may include, for example, rules 10, historical field data 12, current vehicle data or current fleet data 14, failure modes or root causes 16, fault codes or symptoms 18 (e.g., system fault codes or system symptoms 20 (e.g., system diagnostic trouble codes (SDTCs)), circuit or component fault codes, circuit symptoms, or component symptoms 22 (e.g., component diagnostic trouble codes (DTCs)), and/or other information. Databases 36 may be stored all or partly in one or both of memory 32, long term storage 34, or another device.

Processor or controller 30 may be, for example, a central processing unit (CPU), a chip, a diagnostic reasoner, or any suitable computing or computational device. Processor or controller 30 may include multiple processors, and may include general-purpose processors and/or dedicated processors such as graphics processing chips. Processor 30 may execute code or instructions, for example, stored in memory 32 or long-term storage 34, to carry out embodiments of the present invention.

Memory 32 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 32 may be or may include multiple memory units.

Long term storage 34 may be or may include, for example, a hard disk drive, a floppy disk drive, a Compact Disk (CD) drive, a CD-Recordable (CD-R) drive, a universal serial bus (USB) device or other suitable removable and/or fixed storage unit, and may include multiple or a combination of such units.

Figure 2:
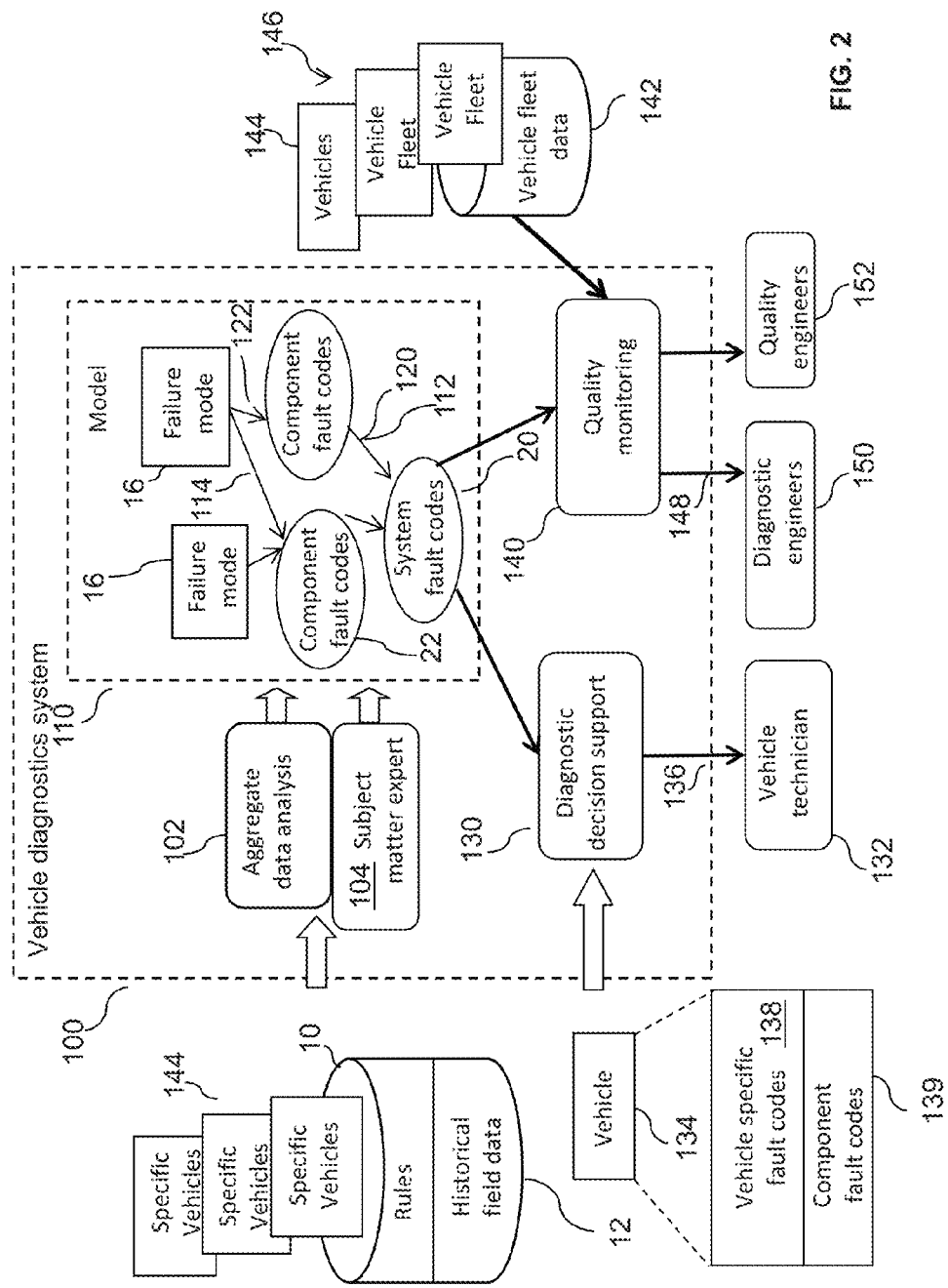
FIG. 2 is a schematic diagram of vehicle diagnostics system according to embodiments of the present invention.

FIG. 2 is a schematic diagram of vehicle diagnostics system according to embodiments of the present invention. Historical field data 12 and rules 10 may, for example, be received by system 100. Historical field data 12 (e.g., historical field failure data or historical vehicle failure data) may, for example, be previously recorded vehicle data relating to vehicle malfunctions, defects, or failures. Historical field data 12 may, for example, include information relating to specific or particular vehicle malfunctions received from warranty reports, shop reports, vehicle technician verbatim (e.g., "write ups"), and other sources. Historical field data 12 may, for example, include fault codes 18 (e.g., system fault codes 20 (e.g., system diagnostic trouble codes (SDTCs)), component fault codes 22 (e.g., component DTCs), and other symptoms or diagnostic trouble codes), failure modes or root causes 16, and other information. Fault codes 18 may, for example, be information representing or defining particular or specific vehicle malfunctions, defects, or failures. Fault codes 18 may, for example, be output from vehicle sensors associated with vehicle components, systems, circuits and devices to a vehicle electronic control unit (ECU) or other device. A system fault code 20 may, for example, be information representing or defining a system (e.g., engine misfire, evaporative system performance, fuel lean/rich, etc.) malfunction or defect. A component fault code 22 may, for example, be information representing or defining a component (e.g., fuel injector circuit, mass airflow (MAF) circuit, etc.) malfunction or defect. fault codes 18 may, in some embodiments, cause a vehicle to output information to vehicle occupants or the driver (e.g., check engine light, check brakes light, etc.).

Failure modes or root causes 16 may, for example, be a failure or malfunction of component (e.g., part name information and other information). which results in a system fault code 20 and/or a component fault code 22 being output. Failure modes 16 may, in some embodiments, include part and/or system name information, description of a malfunction or failure, and/or other information. A failure mode may, for example, be that a mass air flow sensor part has short to ground circuit failure or other failure mode. In mathematical notations used herein, failure modes may, for example, implicitly include part and/or system names. For example, a component fault code 22 (e.g., a component DTC) may be information output from a diagnostic algorithm in ECU which monitors component performance or the circuits of a component. For example, a component fault code 22 may be a fuel injector circuit DTC, and a fuel injector circuit DTC may be output from a sensor measuring the function of the fuel injector and/or other components. If there is a circuit failure (e.g. short to ground, short to voltage, open/high resistance, etc.) in fuel injector circuit then fuel injector circuit fault code (e.g., circuit DTC) is stored in engine control module. For example, if the fuel injector or other component fails or malfunctions and a component DTC 22 is output, the failure or malfunction may be the failure mode or root cause 16 of the component DTC 22.

Historical field data 12 may, for example, be derived from or received from a variety of sources (e.g., warranty reports, service manual(s), service shop data, technician verbatim (e.g., vehicle technician report or write-up), telemetric data, the field and other sources) relating to specific or particular vehicle malfunctions, defects, or errors. Rules 10 (e.g., diagnostic rules) may, for example, be relationships between fault codes 18, vehicle failure modes 16, and other information. For example, rules 10 may include combinations of system fault codes 20, component fault codes 22, and failure modes 16 which are likely to occur together or simultaneously. An example rule 10 may, for example, be that a certain system fault codes 20 may be highly likely if a component fault codes 22 occurs. Rules 10 (e.g., diagnostic rules) may, for example, be related to or received at system 100 from a service manual, quality assurance requirements, fault models, and/or other guidelines for a given vehicle.

According to some embodiments, a model 110 may be generated, created, or defined during a learning operation or approach based on inputted data (e.g., historical field data 12, rules 10 and other data). Model 110 may, for example, be a probabilistic hierarchical model, graphical model, acyclic graphical model, mathematical model or other type model. For example, historical data 12 (e.g., including system fault codes 20, component fault codes 22, failure modes 16, other fault codes, and/or other data) and/or service procedures may be used to generate model 110. Model 110 may, for example, include causal relationships between system fault codes 20, component fault codes 22, failure modes 16, and other information. Causal relationships between system fault codes 20, component fault codes 22, failure modes 16, and other information may, for example, be determined or defined using aggregate data analysis (102) or other methods. Causal weights between system fault codes 20, component fault codes 22, failure modes 16, and other information may, for example, be determined or defined using aggregate data analysis (102) (e.g., using rules 10) or other methods. A weight between two codes (e.g., first level causal weights between system fault codes and component fault codes, second level causal weights between component fault codes and failure modes) may be for example the likelihood that two codes will occur or appear together. For example, causal weights between component fault codes and failure modes may be a measure of the likelihood that component fault codes occur at the same time as failure modes. Causal relationships, causal weights, and other information may, for example, be audited (104) or verified by a subject matter expert (SME) or another person. Other techniques or approaches and other data or information may of course be used to generate model 110 (e.g., graphical model).

When discussed herein, graphical model 110 (e.g., probabilistic hierarchical model, graphical model, acyclic graphical model) may be an organization of information in a computer system. The organization of information may include one or more nodes (e.g., representing system fault codes 20, component fault codes 22, failure modes 16, and other vehicle related data), weighted links between nodes (e.g., causal relationships and causal weights between system fault codes 20, component fault codes 22, failure modes 16, and other vehicle related data) and other relationships. For the purposes of description, graphical model 110 may be described using visual terms to aid in readability and reader understanding. The organization of information (e.g., graphical model 110) may, however, be stored in a computer system as related or organized data or information in a form not recognizable by a human (e.g., not in a graph form).

According to some embodiments, historical field data 12 may, for example, be processed or analyzed during an aggregate data analysis operation 102 to convert historical field data 12 (e.g., system fault codes 20, component fault codes 22, failure modes 16, etc.) into a predefined form or format compatible or suitable for use in a model 110 (e.g., graphical model, probabilistic hierarchical model, etc.). According to some embodiments, service procedures (e.g., input from vehicle service manual or another source) may be processed during an aggregate data analysis operation 102 to convert service procedures into a format compatible or suitable for use in model 110. Service procedures may, for example, include system fault codes 20, component fault codes 22, failure modes 16, and/or other fault codes or information representing system fault codes 20, component fault codes 22, failure modes 16, and/or fault codes. Aggregate data analysis 102 may, for example, be used to determine causal relationships. For example, causal relationships or dependencies between system fault codes 20 and one or more component fault codes 22 may be determined. Similarly, causal relationships between one or more component fault codes 22 and one or more failure modes 16 may be determined. A causal relationship may, for example, represent a correlation or relationship between two events, variables, or parameters (e.g., system fault codes 20, component fault codes 22, failure modes 16, etc.). A causal relationship may, for example, indicate that there is at least some confidence, likelihood or probability that two or more events, variables, or parameters may occur in conjunction with one another. For example, a system fault code 20 and a component fault code 22 may be causally related if there is some confidence that a system fault code 20 and component fault code 22 share or result from the same root cause. A system fault code 20 may be causally related to or causally dependent on a component fault code 22 if, for example, historical field data 12 includes a correlation between system fault code 20 and component fault code 22 (e.g., system fault code 20 and component fault code 22 appear in a set or record (e.g., a warranty report) in historical field data 12). Causal dependency or relationships may of course be generated using other methods and using other variables or parameters.

According to some embodiments, causal relationships between one or more system fault codes 20 and one or more component fault codes 22 and causal relationships between one or more component fault codes 22 and one or more failure modes 16 may be used to generate a graphical model 110 (e.g., a probabilistic hierarchical model, acyclic graphical model, or other type of model). Graphical model 110 may, for example, be a hierarchical model and may include one or more levels. Graphical model 110 may, for example, include first model level including first level causal relationship(s) 112 (e.g., system fault code(s) 20 and component fault code(s) 22 causal relationship(s)), a second model level including second level causal relationship(s) 114 (e.g., component fault code(s) 22 and failure mode(s) 16 causal relationship(s)), and potentially other model levels.

According to some embodiments, causal weights may be determined at each level of graphical model 110. First level causal probability, likelihood, or weights 120 (e.g., system-level causal weights or system to component causal probabilities, likelihood or weights) may, for example, be calculated or determined. First level causal weights 120 may, for example, represent or be equivalent to the probability or likelihood that a given component fault code 22 occurs or will occur with or in conjunction with a given system fault code 20.

In some embodiments, first level causal weights 120 may represent the likelihood or probability that a given one or more component fault codes 22 and a given system fault code 20 will occur in the same warranty report, service shop data, telemetric data, or other data. First level causal weights 120 may, for example, represent a correlation between a given component level fault code 22 and system-level fault code 20. First level causal weights 120 may, for example, be represented by a numerical value, a percentage, or other value or parameter representing, quantifying, or defining the causal and/or correlative relationship between a component level fault code 22 and a system-level fault code 20.

For example, a system fault code 20 may be an engine misfire system fault code. System fault code 20 (e.g., engine misfire system fault code) may be causally related to one or more component fault codes 22, including, for example, injector 1 control circuit fault code, HO2S heater performance sensor 1 fault code, fuel trim system lean fault code, and other component fault codes 22. First level causal weight 120 between engine misfire system fault code and an injector 1 control circuit fault code may, for example, be equivalent to 1 or another value. First level causal weight 120 between engine misfire system fault code and an HO2S heater performance sensor 1 fault code may, for example, be 0.85 or another value. First level causal weight 120 between engine misfire system fault code and fuel trim system lean fault code may, for example, be 0.7 or another value. Engine misfire system fault code and injector 1 control circuit fault code may, for example, be more highly or strongly correlated than engine misfire system fault code and HO2S heater performance sensor 1 fault code. Similarly, engine misfire system fault code and HO2S heater performance sensor 1 fault code may, for example, be more highly or strongly correlated than engine misfire system fault code and fuel trim system lean fault code.

According to some embodiments, second level causal probability, likelihood, or weights 122 (e.g., component level causal weights or component to failure mode causal probability, likelihood, or weights) may be calculated or determined Second level causal weights 122 may, for example, represent or be equivalent to the probability or likelihood that a given failure mode 16 occurs or will occur with or in conjunction with a given component fault code 22. In some embodiments, second level causal weights 122 may represent the likelihood or probability that a given one or more component fault codes 22 and a given failure mode 16 will occur in the same warranty report, service shop data, telemetric data, or other data. Second level causal weights 122 may, for example, represent a correlation between one or more failure modes 16 and one or more component level fault codes 22. Second level causal weights 122 may, for example, be represented by a numerical value, a percentage, or other value or parameter representing, quantifying, or defining the causal and/or correlative relationship between a failure mode 16 and a component level fault code 22. A component level fault code 22 may, for example, be correlated to or associated with multiple failure modes 16. Similarly, a failure mode 16 may, for example, be correlated to or associated with multiple component level fault codes 22.

For example, a failure mode 16 (e.g., fuel injector replacement (e.g., including part name information and failure description information) and/or other failure modes) may be related to multiple component level fault codes 22 (e.g., mass airflow (MAF) sensor circuit low frequency, fuel trim system rich, and other component level fault codes). Second level causal weight 122 between fuel injector replacement failure mode and fuel trim system rich component fault code may, for example, be 1 or another value. Second level causal weight 122 between fuel injector replacement failure mode and mass airflow sensor circuit low frequency fault code may, for example, be 0 or another value. Fuel injector replacement failure mode and fuel trim system rich component fault code may, for example, be more highly or strongly correlated than fuel injector replacement failure mode and mass airflow sensor circuit low frequency fault code.

According to some embodiments, a subject matter expert (104) (e.g., a person with expert knowledge of vehicle, related equipment (e.g., servicing tools and devices), and/or vehicle failure modes), may use historical data 12, rules 10 (e.g., diagnostic rules), and/or other information to audit or verify causal weights, likelihood, or probabilities. This operation need not be done. Model 110 (e.g., including first level causal relationships 112, first level causal weights 120, second level causal relationships 114, second level causal weights 122) may, for example, be output (e.g., via an output device 42) to a subject matter expert (104) for analysis. According to some embodiments, during a subject matter expert audit (104) first level causal relationships 112, first level causal weights 120, second level causal relationships 114, second level causal weights 122, and possibly other information in system 100 (e.g., in model 110) may be modified by an SME. An SME may, for example, modify, alter, or change first level causal weights 120 and second level causal weights values 122 numerical values, percentages, or other information. Modified first level causal weights 120 values, second level causal weights 122 values, and other information may be received at or entered into system 100 by SME (e.g., using an input device 40). Model 110 may, for example, be altered or modified by system 100 based on or in accordance with modified first level causal weights 120 values, second level causal weights 122 values, and other information received by system 100. An SME may, in some embodiments, input other information to system 100 or modify other information in model 110.

According to some embodiments, graphical model 110 may be used to provide diagnostic decision support (130) at dealer shops, technical support centers, or other vehicle related facilities. A vehicle 134 (e.g., a car, truck, or another vehicle) may, for example, exhibit malfunctions. Vehicle 134 may include an electronic control unit (ECU) and ECU may receive one or more fault codes 18 (e.g., system fault codes 20, component fault codes 22, or other fault codes) from various sensors in or associated with vehicle 134. Typically a vehicle technician 132 may, for example, receive one or more fault codes 18 from ECU and diagnose vehicle malfunction. According to embodiments of the present invention, graphical model 110 may be used by system 100 to determine a conditional probability (e.g., a probability inference or causal probability) of one or more failure modes 16 based on one or more vehicle specific or individual vehicle fault codes (e.g. vehicle specific system fault codes 138, vehicle specific component fault codes 139, or other fault codes) output from vehicle 134 (e.g., vehicle ECU or another device). A probability inference may, for example, be a conclusion or prediction drawn from or based upon a model (e.g. graphical model 110) or other data. A probability inference may include a conclusion based on conditional probability, marginal probability, or another type of probability. A probability inference may, for example, represent the confidence, likelihood, or probability of multiple events occurring. A probability inference may, for example, be used to rank the confidence of multiple events occurring based on given data. For example, multiple failure modes 16 may be ranked based on the likelihood or confidence that each failure mode 16 will occur in conjunction with a specific combination of system fault codes, component fault codes, and/or other data.

According to some embodiments, the conditional probability of failure modes 16 may, for example, be used to rank multiple failure modes 16 in terms of probability or likelihood of occurrence based on one or more vehicle specific fault codes (e.g. vehicle specific system fault codes 138, vehicle specific component fault codes 139, or other fault codes). Based on the ranking of multiple failure modes 16 in terms of conditional probability, high probability failure modes 136 (e.g., a list of fault modes or fault mode recommendation list) may, in some embodiments, be output to technician 132. Based on high probability failure modes or fault mode recommendation list 136, vehicle technician 132 may, for example, confirm or verify high probability failure modes 16 by inspecting vehicle 134 and correcting one or more high probability failure modes 16. Technician 132 may, for example, correct one or more high probability failure modes 16 by replacing parts, repairing systems, or performing other corrective actions. Other methods may be used to determine vehicle fault modes.

In some embodiments, graphical model 110 may be used in quality monitoring operations 140. Vehicle fleet data 142 may, for example, be received by system 100. Vehicle fleet data 142 may, for example, include fault codes 18 (e.g., system fault codes 20, component fault codes 22, or other fault codes), failure modes 16, and/or other data associated with one or more vehicles 144 in a fleet of vehicles 146. Graphical model 110 may, for example, be used to categorize (140) one or more vehicles 144 in a fleet of vehicles 146 (e.g., vehicle fleet 146) based on vehicle fleet data 142. Vehicles 144 may, for example, be categorized based using a joint probability (e.g., probability inference or causal probability) of system fault codes 20, component fault codes 22, failure modes 16, and/or other data associated with vehicle 144. Based on the vehicle categorization 148 (e.g., vehicle faults categorization), diagnostic engineers 150 may, for example, analyze trends across vehicle fleet 146. Diagnostic engineers 150 may, for example, investigate anomalies in vehicle fleet data 142, warranty claims data, operating parameter identifier (PIDs) data from many different sources (e.g., service shops, telematics services, etc.), and/or perform other actions. Based on the vehicle categorization 148 (e.g., vehicle faults categorization), quality engineers 152 may, for example, monitor specific car dealers (e.g., car dealerships), repair shops, warranty departments, etc.

In some embodiments, graphical model 110 may be updated by system 100 (e.g., by processor 30) based on current vehicle fleet data 142 to include combinations of system fault codes 20, component fault codes 22, failure modes 16, and other data not in graphical model 110. Graphical model 110 may, therefore, be refined and updated based on current vehicle fleet information or data 142.

The operations of modules in system 100 and or other modules, operations, systems, or methods discussed herein may, for example, be performed by processor 30 within system 100 executing instructions stored in memory 20 within system 100, but may be performed by another processor, by dedicated hardware, or other systems.

Figure 3:
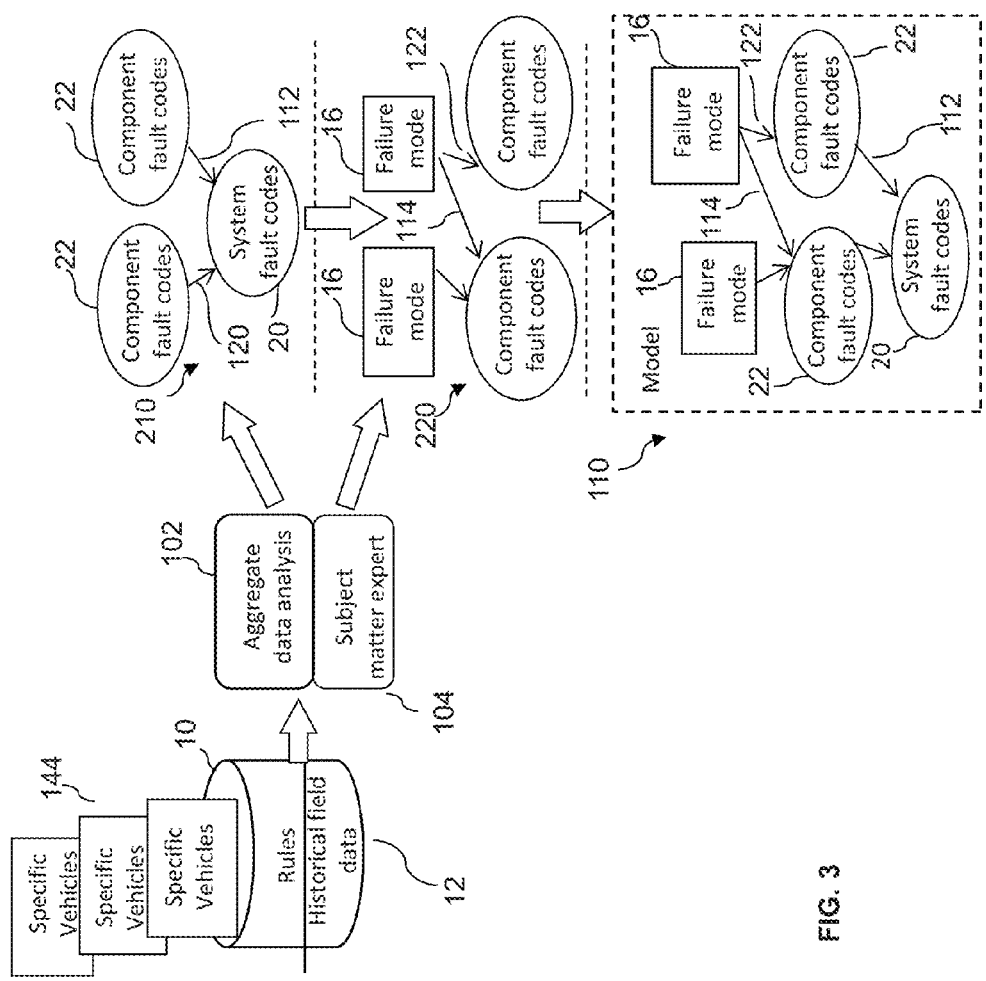
FIG. 3 is a schematic diagram of a portion of a vehicle diagnostics system according to embodiments of the present invention.

FIG. 3 is a schematic diagram of a portion of a vehicle diagnostics system according to embodiments of the present invention. According to some embodiments, a model 110 may be generated during a learning operation or approach based on historical data 12, rules 10, and/or other possibly other data. Model 110 may, for example, be a probabilistic hierarchical model, graphical model, acyclic graphical model, mathematical model or other type model. Historical field data 12 (e.g., system-level fault codes 20, component fault codes 22, other fault codes 18, failure modes 16, and other data) and rules 10 (e.g., diagnostic rules) may be used to generate a model 110.

According to some embodiments, aggregate data analysis 102 may, for example, be used to define multiple model levels each model level including causal relationships and causal weights. Historical field data 12 may be processed or analyzed during an aggregate data analysis operation 102 to convert historical field data 12 (e.g., system fault codes 20, component fault codes 22, failure modes 16, etc.) into a predefined form or format compatible or suitable for use in a model 110 (e.g., a probabilistic hierarchical model). Aggregate data analysis 102 may, for example, be used to determine causal relationships and causal weights within historical field data 12. For example, causal relationships and causal weights between system fault codes 20 and one or more component fault codes 22 may be determined. Similarly, causal relationships and causal weights between one or more component fault codes 22 and one or more failure modes 16 may be determined.

According to some embodiments, a first level model 210 including first level causal relationships 112 and first level causal weights 120 may be generated. First level causal relationships 112 may, for example, be defined between system fault codes 20 and component fault codes 22. First level causal relationships 112 may, for example, be defined using an aggregate data analysis operation 102 or other method or mathematical approach. Aggregate data analysis operation 102 may, for example, define relationships between system fault codes 20 and component fault codes 22 by determining if and/or how many times an SDTC 20 appears in the same warranty report, vehicle technician report, telemetric data, or other historical field data 12 with one or more component fault codes 22. For example, it may be determined which component fault codes 22 are related to a given SDTC 20, and the relationships may be represented in first level causal relationships 112 in model 110.

According to some embodiments, first level causal weights, likelihood, or probability relationship(s) 120 between system fault codes 20 and component fault codes 22 may be determined First level causal weights, $w_i$, 120 (e.g., system-level causal weights, system to component causal probabilities, likelihood or weights) may, for example, be calculated or determined. First level causal weights 120 may, for example, include or may be equivalent to conditional probabilities of the system fault codes 20 given the component fault codes 22. First level causal weights, $w_i$, 120 (e.g., ith first level causal weight or causal related to an ith component) may, for example, be or may represent the conditional probability or likelihood of a system diagnostic trouble code 20, SDTC, given a component diagnostic trouble code 22, $DTC_i$, (e.g., an ith component fault code or DTC). First level causal weight(s) 120 may, for example, be calculated or determined using an equation such as:

$$w_i = P(SDTC|DTC_i)$$

First level causal weight(s), $w_i$, 120 may, for example, represent the probability (e.g., conditional probability) or confidence that a system fault code 20, SDTC, will occur or be present given that a component fault code 22, $DTC_i$, occurs or is present. First level causal weight(s) 120, $w_i$, may, for example, be determined or calculated using a product rule (e.g., Bayes' rule) for graphical models or another mathematical approach.

First level causal weight(s), $w_i$, 120 may, for example, be an indication or representation of the confidence that a component fault code 22 shares a common root failure or root cause with a given system fault code 20. First level causal weights 120 may, for example, be represented by a numerical value, a percentage, or other value or parameter representing, quantifying, or defining the confidence that a system fault code 20 shares a common root failure or root cause with a given system fault code 20. First level causal weights 120 may, for example, include or may be equivalent to conditional probabilities of a system fault code 20 given component fault codes 22.

According to some embodiments, multiple first level causal weight(s), $w_i$, 120 may be determined. For example, a system-level fault code 20 may, for example, be correlated to multiple component level fault codes 22 (e.g., i different component level fault codes) and the confidence that a system fault code 20 shares a common root failure or root cause with multiple component fault codes 22 may be determined. For example, a system fault code 20 (e.g., engine misfire or other system-level fault code) may be related to multiple component level fault codes 22 (e.g., fuel injector circuit, mass airflow (MAF) sensor, manifold absolute pressure (MAP) sensor, rough road conditions, and other component level fault codes).

According to some embodiments, during a subject matter expert audit (104) a subject matter expert may audit or validate first level causal weights 120, $w_i$. Historical data 12, rules 10, first level causal relationships 112, first level causal weights 120, $w_i$, and other data may, for example, be output (e.g., via an output device 42) to a subject matter expert (104) for analysis. Subject matter expert may, for example, modify system to component level causal weights 120, $w_i$, based on rules 10 (e.g., diagnostic rules), personal knowledge, or other information. and thereby update or modify graphical model 110. Subject matter expert (104) may, for example, audit historical field data 12, first level causal weights 120, $w_i$, and other data to identify anomalies, noise, and/or errors. An SME may input modified historical field data 12, first level causal weights 120 values, and other information to system 100. Modified historical field data 12, first level causal weights 120 values, and other information may be received by system 100 (e.g., using an input device 40). Model 110 may, for example, be altered or modified by system 100 based on or in accordance with modified historical field data 12, first level causal weights 120 values, or other information received by system 100. For example, historical field data 12 (e.g., system fault codes 20, component fault codes 22, and other fault codes 18), first level causal weights 120 values, or other information in model 110 may, for example, be modified, changed, or updated by system 100. An SME may, in some embodiments, input other information to system 100 or modify other information in model 110.

According to some embodiments, a second level model 220 including second level causal relationships 114 and second level causal weights 122 may be generated. Second level causal relationships 114 (e.g., component to failure mode causal relationships) may, for example, be defined between component fault codes 22 and failure modes 16 (e.g., part name information and other information). Second level causal relationships 114 may, for example, be defined using an aggregate data analysis operation 102 or other method or mathematical approach. Aggregate data analysis operation 102 may, for example, define relationships between component fault codes 22 and failure modes 16 by determining if and/or how many times one or more component fault codes 22 appear in the same data entry (e.g., warranty report, vehicle technician report, telemetric data, or other historical field data 12 entry) with one or more failure modes 16. For example, it may be determined which component fault codes 22 are related to a failure mode 16, and the relationships may be represented in second level causal relationships 114 in model 110.

According to some embodiments, causal weights, likelihood, or probability relationship(s) between system fault codes 20 and component fault codes 22 may be determined Second level causal weights, $d_{ij}$, 122, (e.g., second level causal weight related to an ith component and a jth failure mode) may, for example, be calculated or determined. Second level causal weight, $d_{ij}$, 122 may, for example, be or may represent the conditional probability or likelihood of a component fault code 22, $DTC_i$, (e.g., an ith component fault code or DTC) given a failure mode or root cause 16, $fm_j$, (e.g., a jth failure mode). When used herein, failure mode 16, $fm_j$, may include a part and/or system name(s) and possibly description of a malfunction or failure of a part. Second level causal weights 122, $d_{ij}$, may, for example, be calculated or determined using an equation such as:

$$d_{ij} = P(DTC_i | fm_j)$$

Second level causal weights 122, $d_{ij}$, may, for example, represent the probability (e.g., conditional probability) or confidence that a component fault code 22, $DTC_i$, will occur or be present given that a system diagnostic trouble code 20, SDTC, occurs or is present. A component fault code 22, $DTC_i$, and a failure mode 16, $fm_j$, $DTC_i$, may, for example, occur in a warranty report entry, vehicle technician report entry, or other historical field data 12. Second level causal weights 122, $d_{ij}$, may, for example, be determined or calculated using product rule (e.g., Bayes' rule) for graphical models or another mathematical approach.

Second level causal weights 122, $d_{ij}$, may, for example, be represented by a numerical value, a percentage, or other value or parameter representing, quantifying, or defining the confidence that a component fault code 22 shares a common root failure or root cause with a given failure mode 16. Second level causal weights 122 may, for example, include or may be equivalent to conditional probabilities of a component fault codes 22 given a failure mode or root cause 16

According to some embodiments, multiple second level causal weights 122, $d_{ij}$, may be determined. For example, a component fault code 22 may be correlated to multiple failure modes 16 and the confidence that a component fault code 22 shares a common root failure or root cause with each of the multiple failure modes 16 may be determined. For example, a component fault code 22 (e.g., fuel injector circuit, mass airflow (MAF) sensor circuit low frequency) may be related to multiple failure modes 16 (e.g., fuel injector failure, fuel injection fuel rail assembly replacement).

According to some embodiments, during a subject matter expert audit (104) a subject matter expert may audit, validate, or modify second level causal weights 122, $d_{ij}$. A subject matter expert (104) may, for example, use historical data 12 (e.g., system fault codes 20, component fault codes 22, and other information), rules 10 (e.g., diagnostic rules), and/or other information to audit component level causal weights 120, $w_i$. Subject matter expert may, for example, audit and modify second level causal weights 122, $d_{ij}$, based on rules 10 (e.g., diagnostic rules), personal knowledge, or other information. and thereby update or modify model 110. An SME may input modified historical field data 12, second level causal weights 122 values, and other information to system 100. Modified historical field data 12, second level causal weights 122 values, and other information may be received by system 100 (e.g., using an input device 40). Model 110 may, for example, be altered or modified by system 100 based on or in accordance with modified historical field data 12, second level causal weights 122 values, or other information received by system 100. For example, historical field data 12 (e.g., system fault codes 20, component fault codes 22, and other fault codes 18), second level causal weights 122 values, or other information in model 110 may, for example, be modified, changed, or updated by system 100. An SME may, in some embodiments, input other information to system 100 or modify other information in model 110.

According to some embodiments, subject matter expert (104) may audit historical field data 12, first level causal relationships 112, second level causal relationships 114, first level causal weights 120, second level causal weights 122, and other data to identify anomalies or errors. Anomalies and errors may, for example, occur if vehicle technician, warranty department employee, car dealership employee, or other user incorrectly enters data into a warranty claim, technician verbatim, repair shop report, or other database included in historical field data 12. Subject matter expert (104) may, for example, modify model 110 to correct anomalies, noise, and/or errors in data by entering data into or modifying data in system 100.

According to some embodiments, first level models 210 second level models 220 and potentially other level models or information may be combined to generate graphical model 110 (e.g., a probabilistic hierarchical model, acyclic graphical model, or other type of model, data set, or information set). Graphical model 110 may, for example, represent the relationship between system-level fault codes 20, component level fault codes 22, failure modes 16, other fault codes 18, and potentially other data. A first level model 210 may, for example, include first level causal relationships 112 between system fault codes 20 and component fault codes 22 and associated system to component level causal weights 120, $w_i$.

A second level model 220 may, for example, include second level causal relationships 114 between component fault codes 22 and failure modes 16 and associated component to failure mode causal weight(s) 122, $d_{ij}$.

According to some embodiments, first level models 210, second level models 220, and potentially other level models or information may be combined by determining common data or information between the level models. Information in one model may, for example, be related to information in another model via the common information. For example, in combining first level models 210 and second level models 220, component fault codes 22 included in both first level models 210 and second level models 220 may be determined by system 100. System fault codes 20 in first level model 210 may, for example, be related to failure modes 16 in second level model 220 via component fault codes 20 included in both first level model 210 and second level model 220. Other methods and approaches may be used to combine level models.

According to some embodiments, prior probabilities of component fault codes may be determined or calculated. Prior probability of a component fault code, $P(DTC_i)$, (e.g., ith component fault code prior probability) may be calculated or determined using an equation such as:

$$P(DTC_i=1)=\rho_i$$

A prior probability of a component fault code, $P(DTC_i)$, may, for example, be or may represent the uncertainty or likelihood of component fault code occurring and may be represented as $\rho_i$. A prior probability of a component fault code, $P(DTC_i)$, may, for example, be used to determine or calculate joint and marginal probabilities. According to some embodiments, a prior probability of a system fault code may be calculated or determined using similar methods to the methods used to determined prior probability of a component fault code.

According to some embodiments, a prior probabilities of failure modes, $P(fm_j)$, (e.g., jth failure mode prior probability) may be calculated or determined using an equation such as:

$$P(fm_j=F)=\pi_j$$

A prior probability of a failure mode, $P(fm_j)$, may, for example, be or may represent the uncertainty or likelihood of failure mode (e.g., including part or system name information) occurring and may be represented as $\pi_j$. A prior probability of a failure mode, $P(fm_j)$, may, for example, be used to determine or calculate conditional or marginal probabilities.

Figure 4:
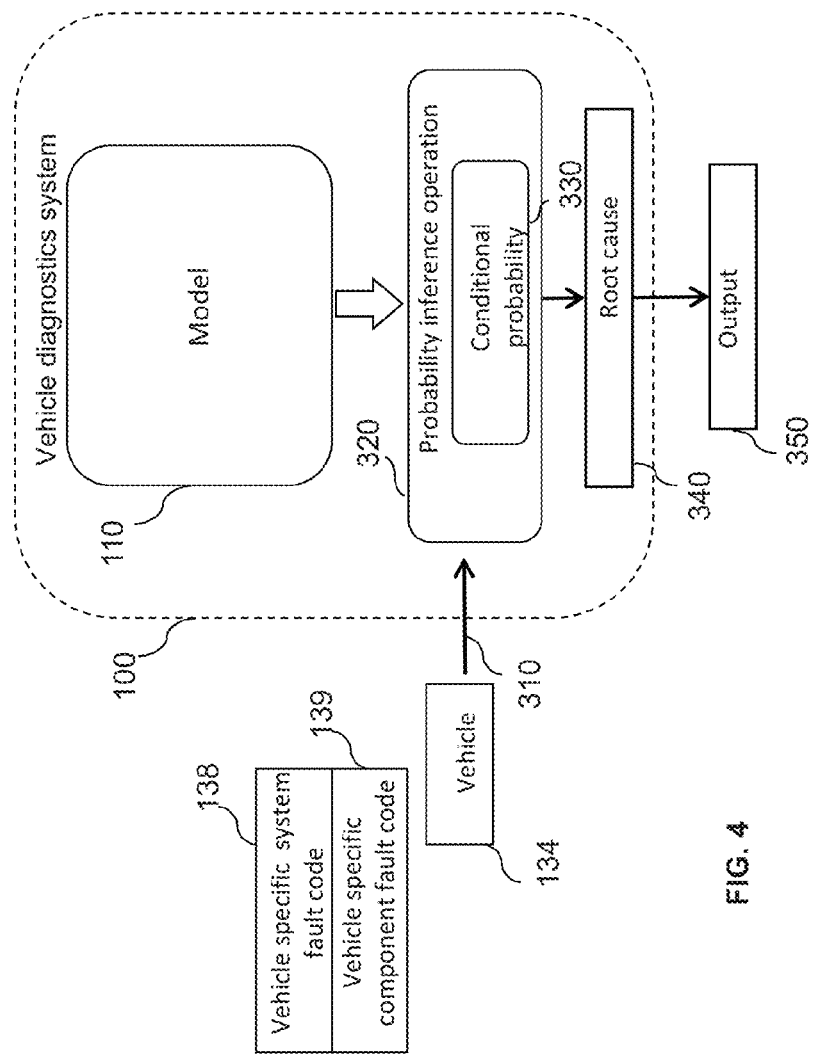
FIG. 4 is a schematic of root cause analysis method according to embodiments of the present invention.

FIG. 4 is a schematic of root cause analysis method according to embodiments of the present invention. According to some embodiments, model 110 may be used to provide diagnostic decision support or root cause analysis. Vehicle 134 may, for example, output individual vehicle or vehicle specific fault codes (e.g., vehicle specific system fault codes 138, component fault codes 139, or other fault codes) to system 100. According to embodiments of the present invention, graphical model 110 may be used by system 100 in a probability inference operation (320) to determine one or more high probability failure modes based on one or more fault codes (e.g. vehicle specific system fault codes 138, component fault codes 139, or another fault codes) output from vehicle 134 (e.g., vehicle ECU or another device). In the probability inference operation 320, conditional probability 330 (e.g., probability inference) or other type of probability of one or more failure modes 16 may, for example, be calculated based on vehicle specific fault codes 138 and vehicle specific component fault codes 139 output from vehicle 134. Conditional probabilities, likelihood, or weights 330 may, for example, be determined or calculated using an equation such as the following equation:

$$P(fm_1 \mid SDTC, DTC_1) = \frac{P(fm_1, SDTC, DTC_1)}{P(SDTC, DTC_1)} = \frac{P(fm_1, SDTC, DTC_1)}{P(DTC_1)P(SDTC \mid DTC_1)}$$

The equation may, for example, represent one possible method of calculating or determining the probability or likelihood (e.g., conditional probability) of failure mode 16 occurring based on vehicle specific system fault codes 138 and vehicle specific component fault codes 139 output from vehicle 134. Other equations, numerical methods, and mathematical approaches may of course be used.

Conditional probability 330 may, for example, be determined or calculated using the product rule (e.g., Bayes' rule) for graphical models or another mathematical approach. Conditional probability 330 may, for example, be calculated based on a prior probability of a first component failure code, $P(DTC_1)$, which may represent the uncertainty or likelihood of a first component failure code occurring. Conditional probability 330, $P(fm_1|SDTC,DTC_1)$, may, for example, represent the probability that a failure mode 16, $fm_1$, will occur or be present given that a vehicle specific system fault code 138, SDTC, and vehicle specific component fault code 139, $DTC_i$, occurs or is present. Conditional probability 330, $P(fm_1|SDTC, DTC_1)$, may, for example, represent a correlation between a given failure mode 16, $fm_1$, vehicle specific component fault code 139, $DTC_1$, and vehicle specific system fault code 138, SDTC. Conditional probability 330, $P(fm_1|SDTC,DTC_1)$, may, for example, be represented by a numerical value, a percentage, or other value or parameter representing, quantifying, or defining the confidence that a failure mode 16 shares a common root failure or root cause with a given vehicle specific system fault code 138 and vehicle specific component fault code 139.

According to some embodiments, conditional probabilities 330 may, for example, be used to rank multiple failure modes 16 in terms of a confidence or likelihood of a failure mode 16 occurring in conjunction with vehicle specific fault codes (e.g. vehicle specific system fault codes 138, vehicle specific component fault code 139, or other fault codes). For example, a first failure mode 16 may be ranked higher than a second failure mode 16, if conditional probability 330 of first failure mode occurring in conjunction with vehicle specific fault codes is higher than conditional probability of second failure mode 16 occurring in conjunction with vehicle specific fault codes. Conditional probabilities 330 may, for example, be used to determine high probability failure modes or most likely root causes 340 based on the probability inferences.

According to some embodiments, based on the ranking of multiple failure modes 16 in terms of conditional probability, high probability failure modes 340 (e.g., most likely root causes, suggested list of fault modes, failure or fault mode recommendation list, etc.) may, in some embodiments, be output to technician for verification (350). Based on high probability failure modes 340, a vehicle technician may, for example, inspect vehicle 134 and correct one or more high probability failure modes or root cause 340. A vehicle technician may, for example, correct one or more high probability failure modes 340 by replacing parts, repairing systems, or performing other corrective actions on vehicle 134. Outputting high probability failure modes 340 to a vehicle technician may allow a vehicle technician to quickly determine failure mode or root cause of a vehicle malfunction.

Figure 5:
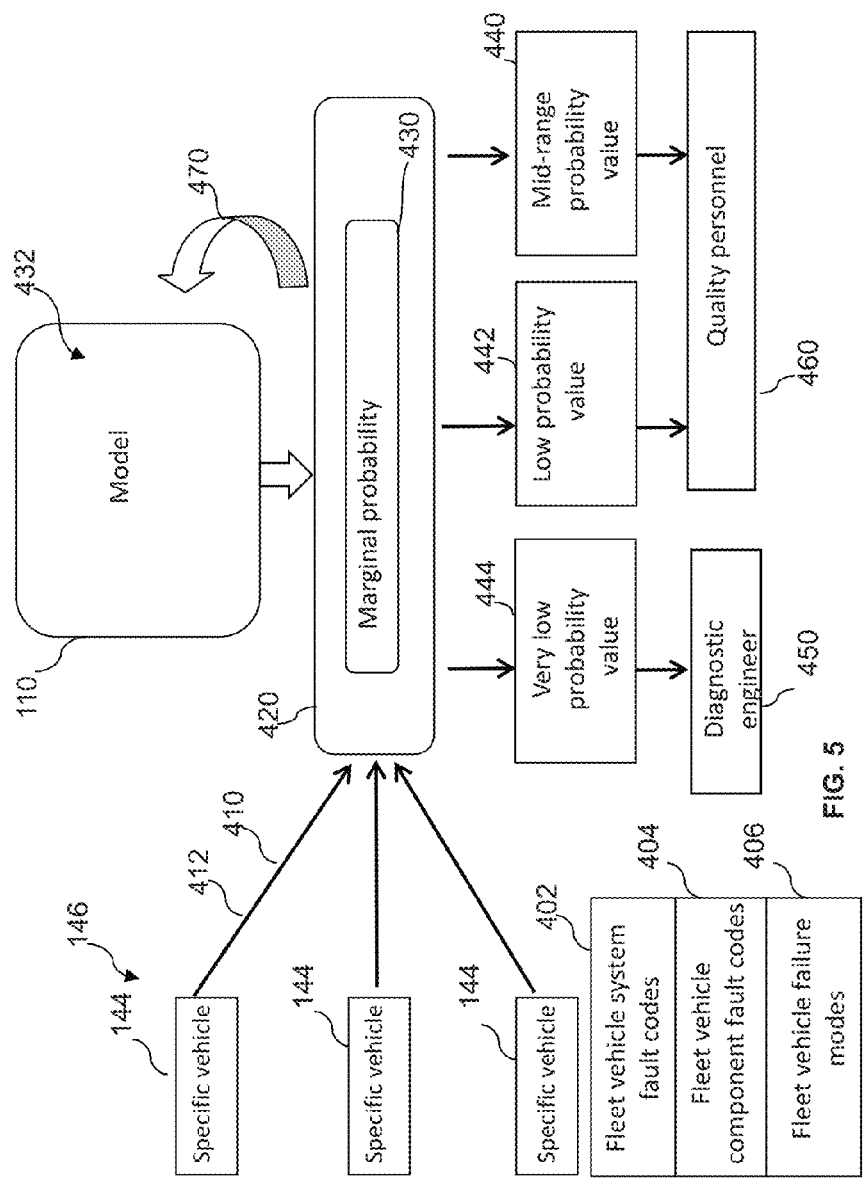
FIG. 5 is a schematic of a quality analysis method according to embodiments of the present invention.

FIG. 5 is a schematic diagram of a quality analysis method according to embodiments of the present invention. Vehicle fleet data 410 may, for example, be received by system 100. Vehicle fleet data 410 may, for example, include vehicle trouble or malfunction records 412. Vehicle trouble records 412 and vehicle fleet data 410 may, for example, include fleet vehicle fault codes (e.g., fleet vehicle system fault codes 402, fleet vehicle fault codes 404, or other fault codes), fleet vehicle failure modes 406, and/or other data associated with one or more vehicles 144 in a fleet of vehicles 146. Graphical model 110 may, for example, be used to categorize 420 one or more vehicles 144 in fleet of vehicles 146 (e.g., vehicle fleet 146) based on vehicle fleet data 142 (e.g., fleet vehicle system fault codes 402, fleet vehicle fault codes 404, fleet vehicle failure modes 406). Vehicles 144 may, for example, be categorized based on a marginal probability 430 (e.g., probability inference) of occurrence of fleet vehicle system fault codes 402, fleet vehicle fault codes 404, fleet vehicle failure modes 406, and/or other data associated with vehicle 144. Marginal probabilities, likelihood, or weights 430 may, for example, be determined or calculated using the sum rule, product rule, factorization rule, and/or other graphical model rules in equations such as the following equation:

$$P(fm_1, SDTC, DTC_1) = \sum_{fm_2, DTC_2} P(fm_1, fm_2, SDTC, DTC_1, DTC_2)$$
$$= P(fm_1) \times P(fm_2)$$
$$\sum_{fm_2, DTC_2} P(DTC_1 | fm_1, fm_2) P(DTC_2 | fm_2)$$
$$P(SDTC | DTC_1, DTC_2)$$

The equation may, for example, represent one possible method of calculating or determining the probability or likelihood (e.g., marginal probability) of occurrence of fleet vehicle system fault codes 402, fleet vehicle component fault codes 404, fleet vehicle failure modes 406, and/or other data associated with vehicle 144. Other equations, numerical methods, and mathematical approaches may of course be used. Marginal probability 430, $P(fm_1,SDTC,DTC_1)$, may, for example, be determined or calculated based on a first failure mode, $fm_1$, a second failure mode, $fm_2$, a system diagnostic trouble code, SDTC, first component fault code, $DTC_1$, and second component fault code, $DTC_2$.

According to some embodiments, marginal probability 430, $P(fm_1 SDTC,DTC_1)$, may, for example, be determined based on a joint graphical model probability 432, $P(fm_1,fm_2, SDTC,DTC_2,DTC_1)$, (e.g., joint model probability, joint probability, etc.). Joint graphical model probability 432, $P(fm_1,fm_2,SDTC, DTC_2,DTC_1)$, may, for example, be calculated or determined using an equation such as:

$$P(fm_1,fm_2,SDTC,DTC_2,DTC_1)=P(fm_1)\times P(fm_2)\times P(DTC_1|fm_1,fm_2)\times P(DTC_2|fm_2)\times P(SDTC|DTC_1,DTC_2)$$

Joint graphical model probability 432, $P(fm_1,fm_2,SDTC, DTC_2, DTC_1)$, may, for example, be determined or calculated using the product rule (e.g., Bayes' rule) and chain rule for graphical models or another mathematical approach. Joint graphical model probability 432 may, for example, be calculated based on a prior probability of a first failure mode, $P(fm_1)$, a probability of a second failure mode, $P(fm_2)$, and other variable and/or parameters. A prior probability of a first failure mode, $P(fm_1)$, may, for example, be or may represent the uncertainty or likelihood of first failure mode occurring. Prior probability of a second failure mode, $P(fm_2)$, may, for example, be or may represent the uncertainty or likelihood of a second failure mode occurring.

According to some embodiments, junction graph, message passing, and/or other mathematical or computational approaches may be used to determine or calculate joint graphical model probability 432, $P(fm_1,fm_2,SDTC,DTC_2, DTC_1)$. To generate a junction graph, variables, or random variables (e.g., system fault codes 20, component fault codes 22, failure modes 16, etc.) which are fully connected may, for example, be grouped by system 100 into a group node. A group of random variables may, for example, be fully connected if each of the variables is causally related to all other variables. Adjacent group nodes may, for example, include one or more common variables. Group nodes may, for example, be connected to adjacent group nodes with common variables to generate a junction graph. Each of the group nodes in the junction graph may, in some embodiments, be related to or communicate with its adjacent or neighboring group nodes through a common variable between the adjacent or neighboring group nodes. In some embodiments, the group nodes may be arranged in a tree and message passing techniques may be used to calculate a joint graphical model probability 432 of multiple random variables. (When discussed herein, organizing information by creating a tree, a graph including nodes and relationships, or other organization described using visual terms, may include creating a data structure internal to a computer system which may be described using visual terms but which may be stored in the computer system in other ways). Other mathematical and computational approaches may of course be used.

Joint graphical model probability 432, $P(fm_1,fm_2,SDTC, DTC_2,DTC_1)$, may, for example, represent the probability, likelihood or confidence that a first failure mode, $fm_1$, second failure mode, $fm_2$, a system diagnostic trouble code, SDTC, first component fault code, $DTC_1$, and second component fault code, $DTC_2$, may share a common root cause or root failure. Joint graphical model probability 432 may, for example, be represented by a numerical value, a percentage, or other value or parameter representing, quantifying, or defining the confidence that first failure mode, $fm_1$, second failure mode, $fm_2$, system diagnostic trouble code, SDTC, first component fault code, $DTC_1$, and second component fault code, $DTC_2$ share a common root cause or root failure.

According to some embodiments, joint graphical model probability 432, $P(fm_1,fm_2,SDTC,DTC_2,DTC_1)$, may be used to calculate or determine marginal probability 430, $P(fm_1,SDTC,DTC_1)$, as discussed herein. Marginal probability 430, $P(fm_1,SDTC,DTC_1)$, may, for example, represent the probability that a fleet vehicle failure mode 406, $fm_j$, fleet vehicle system diagnostic trouble code 402, SDTC, and fleet vehicle component fault code 404, $DTC_i$, may share a common root cause or be causally related. Marginal probability 430, $P(fm_1,SDTC,DTC_1)$, may, for example, be represented by a numerical value, a percentage, or other value or parameter representing, quantifying, or defining the confidence that first failure mode, $fm_1$, system diagnostic trouble code, SDTC, and first component fault code, $DTC_1$, share a common root cause or are otherwise related.

Based on marginal probabilities 430, vehicle malfunction records 412 (e.g., vehicle fleet data 410 relating to specific vehicles 144 in vehicle fleet 146) may, for example, be categorized (420) (e.g., in a vehicle faults categorization operation 420). For example, if marginal probability 430 representing or relating to a vehicle malfunction record 412 (e.g., calculated based on fleet vehicle system fault codes 402, fleet vehicle component fault codes 404, fleet vehicle failure modes 406, etc.) is above a predefined threshold (e.g., above 0.8, between 0.8 and 1, or another threshold), vehicle malfunction record 412 may be deemed to related to a vehicle failure or root cause that vehicle diagnostics identified.

If, for example, marginal probability 430 representing a vehicle malfunction record 412 is deemed a medium or midrange probability value 440 (e.g., between 0.6 and 0.8 or another range of probability values), vehicle malfunction record 412 may be output to quality personnel 460 (e.g., brand quality manager, quality analyst, etc.) or other user. Quality 460 may, for example, investigate repairs on specific vehicle 144 associated with malfunction record 412 (e.g., calculated based on fleet vehicle system fault codes 402, fleet vehicle component fault codes 404, fleet vehicle failure modes 406, etc.) or take other action. Quality 460 may, in some embodiments, monitor specific car dealers (e.g., car dealerships), repair shops, warranty departments, etc. associated with or related to malfunction record 412 or vehicle fleet data 410.

According to some embodiments, if marginal probability 430 representing a vehicle malfunction record 412 is deemed a low probability value 442 (e.g., between 0.2 and 0.6 or another range of probability values), vehicle malfunction record 412 (e.g., including fleet vehicle system fault codes 402, fleet vehicle component fault codes 404, fleet vehicle failure modes 406, etc.) may be output to quality personnel 460 or other user. Quality personnel 460 may, for example, investigate repairs performed on specific vehicle 144 associated with malfunction record 412, meet with diagnostic engineer(s) 450 to determine the root cause of the malfunction, and/or take other action.

According to some embodiments, if marginal probability 430 representing a vehicle malfunction record 412 is deemed a very low probability value 444 (e.g., between 0 and 0.05 or another range of probability values, or below a probability threshold), vehicle malfunction record 412 (e.g., including fleet vehicle system fault codes 402, fleet vehicle component fault codes 404, fleet vehicle failure modes 406, etc.) may be output to a diagnostic engineer 450 or other user. Diagnostic engineer 450 may, for example, determine the root cause of the malfunction in the specific vehicle 144 associated with malfunction record 412 or take other action.

In some embodiments, graphical model 110 may be updated (470) based on current vehicle fleet data 410 and/or vehicle malfunction record(s) 412 to include combinations of system fault codes 20, component fault codes 22, failure modes 16, and other data not in graphical model 110. For example, a vehicle malfunction record 412 received by system 100 may include a combination of fleet vehicle system fault codes 402, fleet vehicle component fault codes 404, fleet vehicle failure modes 406, and/or other information not in model 110. Graphical model 110 may, therefore, be refined or updated to add vehicle fleet information 410 and/or vehicle malfunction record 412 including the combination not already in model 110. In some embodiments, an SME may audit the addition of new information to ensure the added information is valid (e.g., not a typo, not already in model 110, not resulting from an error), and may modify added vehicle fleet information 410 or vehicle malfunction record 412 by entering information in system 100 (e.g., via input device 40).

Figure 6:
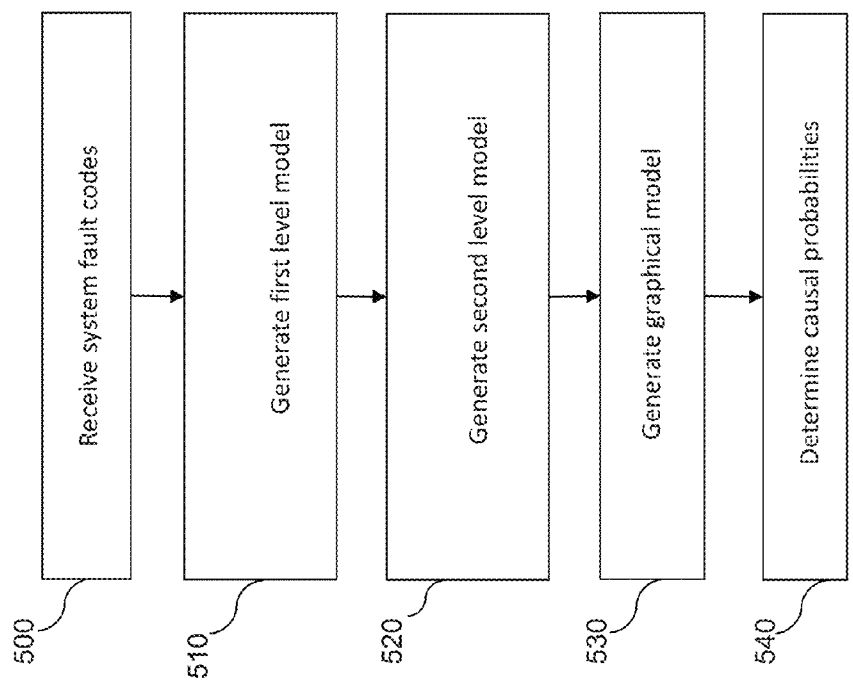
FIG. 6 is a flow chart of a method according to embodiments of the present invention.

FIG. 6 is a flow chart of a method according to embodiments of the present invention. In operation 500, system fault codes (e.g., system fault codes 20 of FIG. 1), component fault codes (e.g., component fault codes 22 of FIG. 1), and failure modes (e.g., failure modes 16 of FIG. 1) may be received at a system (e.g., system 100 of FIG. 1).

In operation 510, a first level model (e.g., first level model 210 of FIG. 3) including first level causal relationships (e.g., first level causal relationships 112 of FIG. 3) and first level causal weights (e.g., first level causal weights 120 of FIG. 3) between the system fault codes and the component fault codes may be generated.

In operation 520, a second level model (e.g., second level model 220 of FIG. 3) including second level causal relationships (e.g., second level causal relationships 114 of FIG. 3) and second level causal weights (e.g., second level causal weights 122 of FIG. 3) between the component fault codes and the failure modes may be generated.

In operation 530, the first level model and the second level model may be combined to generate a model such as a graphical model (e.g. graphical model 110 of FIG. 2). Graphical model may, for example, be a probabilistic hierarchical model, acyclic graphical model or other type of model.

In operation 540, one or more causal probabilities (e.g., conditional probability 330 of FIG. 4, marginal probability 430 of FIG. 5) may be determined using the graphical model. For test-fleet monitoring and root cause analysis, one or more causal probabilities may, for example, be used to generate probability inference(s) using the graphical model.

Other or different series of operations may be used.

Embodiments of the present invention may include apparatuses for performing the operations described herein. Such apparatuses may be specially constructed for the desired purposes, or may comprise computers or processors selectively activated or reconfigured by a computer program stored in the computers. Such computer programs may be stored in a computer-readable or processor-readable non-transitory storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the invention as described herein. Embodiments of the invention may include an article such as a non-transitory computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method comprising:
receiving system fault codes, component fault codes, and failure modes;
generating a first level model comprising first level causal relationships and first level causal weights between the system fault codes and the component fault codes;
generating a second level model comprising second level causal relationships and second level causal weights between the component fault codes and the failure modes;
combining the first level model and the second level model to generate a graphical model; and
determining, using the graphical model, one or more probability inferences.

2. The method of claim 1, wherein:
the first level causal weights comprise conditional probabilities of the system fault codes given the component fault codes; and
the second level causal weights comprise conditional probabilities of the component fault codes given the failure modes.

3. The method of claim 1, comprising:
receiving one or more vehicle specific system fault codes and one or more vehicle specific component fault codes;
determining one or more high probability failure modes based on the probability inferences, wherein determining, using the graphical model, one or more probability inferences comprises determining conditional probabilities based on the vehicle specific system fault codes, the vehicle specific component fault codes and the graphical model; and
outputting high probability failure modes to a user.

4. The method of claim 1, comprising:
receiving a vehicle malfunction record comprising one or more fleet vehicle system fault codes, one or more fleet vehicle component fault codes, and one or more fleet vehicle failure modes;
categorizing the vehicle malfunction record based on the probability inferences, wherein determining, using the graphical model, one or more probability inferences comprises determining marginal probabilities based on the fleet vehicle system fault codes, the fleet vehicle component fault codes, and the fleet vehicle failure modes; and
outputting the categorized vehicle malfunction record to a user.

5. The method of claim 4, wherein outputting the categorized vehicle malfunction record to a user comprises outputting, if the categorized vehicle malfunction record comprises a low or medium probability, the one or more vehicle trouble records to a quality manager.

6. The method of claim 4, wherein outputting the one or more categorized vehicle trouble records to a user comprises outputting, if the categorized vehicle malfunction record comprises a probability below a threshold, the one or more vehicle trouble records to a diagnostic engineer.

7. The method of claim 1, comprising:
receiving one or more vehicle malfunction records comprising one or more fleet vehicle system fault codes, one or more fleet vehicle component fault codes, and one or more fleet vehicle failure modes; and
updating the graphical model to comprise one or more vehicle malfunction records not previously in graphical model.

8. The method of claim 1, wherein the graphical model comprises a probabilistic hierarchical model.

9. A system comprising:
a memory; and
a processor to:
receive system fault codes, component fault codes, and failure modes;
generate a first level model comprising first level causal relationships and first level causal weights between the system fault codes and the component fault codes;
generate a second level model comprising second level causal relationships and second level causal weights between the component fault codes and the failure modes;
combine the first level model and the second level model to generate a graphical model; and
determine, using the graphical model, one or more causal probabilities.

10. The system of claim 9, wherein:
the first level causal weights comprise conditional probabilities of the system fault codes given the component fault codes; and
the second level causal weights comprise conditional probabilities of the component fault codes given the failure modes.

11. The system of claim 9, wherein the processor is to:
receive one or more vehicle specific system fault codes and one or more vehicle specific component fault codes;
determine one or more high probability failure modes based on the causal probabilities, wherein to determine, using the graphical model, one or more causal probabilities the processor is to determine conditional probabilities based on the vehicle specific system fault codes, the vehicle specific component fault codes and the graphical model; and
output high probability failure modes to a user.

12. The system of claim 9, wherein the processor is to:
receive a vehicle malfunction record comprising one or more fleet vehicle system fault codes, one or more fleet vehicle component fault codes, and one or more fleet vehicle failure modes;
categorize the vehicle malfunction record based on the causal probabilities, wherein to determine, using the graphical model, one or more causal probabilities the processor is to determine marginal probabilities based on the fleet vehicle system fault codes, the fleet vehicle component fault codes, and the fleet vehicle failure modes; and
output the categorized vehicle malfunction record to a user.

13. The system of claim 12, wherein to output the categorized vehicle malfunction record to a user the processor is to output, if the categorized vehicle malfunction record comprises a low or medium probability, the one or more vehicle trouble records to a quality manager.

14. The method of claim 12, wherein to output the one or more categorized vehicle trouble records to a user the processor is to output, if the categorized vehicle malfunction record comprises a probability below a threshold, the one or more vehicle trouble records to a diagnostic engineer.

15. The system of claim 9, wherein the processor is to:
receive one or more vehicle malfunction records comprising one or more fleet vehicle system fault codes, one or more fleet vehicle component fault codes, and one or more fleet vehicle failure modes; and
update the graphical model to comprise one or more vehicle malfunction records not previously in graphical model.

16. The system of claim 9, wherein the graphical model comprises an acyclic graphical model.

17. A method comprising:
receiving system diagnostic trouble codes (DTCs), component DTCs, and root causes;
determining a first level model comprising first level causal relationships and first level causal weights between system DTCs and component DTCs;
determining a second level model comprising second level causal relationships and second level causal weights between component DTCs and root causes; and
generating an acyclic graphical model based on the first level model and the second level model.

18. The method of claim 17, comprising:
receiving one or more individual vehicle system DTCs and one or more individual vehicle component DTCs;
calculating a causal probability using the acyclic graphical model in conjunction with the individual vehicle system DTCs and one or more individual vehicle component DTCs;
determining one or more highly likely root causes based on the causal probability; and
displaying the one or more highly likely root causes to a user.

19. The method of claim 17, comprising:
receiving a vehicle trouble record comprising one or more fleet vehicle system DTCs, one or more fleet vehicle component DTCs, and one or more fleet vehicle failure modes;
calculating a marginal probability using the acyclic graphical model in conjunction with the one or more fleet vehicle system DTCs, the one or more fleet vehicle component DTCs, and the one or more fleet vehicle failure modes;
categorizing the vehicle trouble record based on the marginal probability; and
outputting the categorized vehicle trouble record to a user.

20. The method of claim 17, wherein:
the first level causal weights comprise conditional probabilities of system DTCs given component DTCs; and
the second level causal weights comprise conditional probabilities of component DTCs given root causes.

* * * * *